United States Patent
Gobel et al.

(10) Patent No.: US 11,640,445 B2
(45) Date of Patent: *May 2, 2023

(54) GRATITUDE PREDICTION MACHINE LEARNING MODELS

(71) Applicant: The Gobel Group, LLC, St. Petersburg, FL (US)

(72) Inventors: Chad Gobel, Brea, CA (US); Nathan Chappell, Brea, CA (US)

(73) Assignee: The Gobel Group, LLC, Chester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,325

(22) Filed: Jun. 7, 2022

(65) Prior Publication Data

US 2022/0366463 A1    Nov. 17, 2022

Related U.S. Application Data

(63) Continuation of application No. 16/823,535, filed on Mar. 19, 2020, now Pat. No. 11,386,469.

(Continued)

(51) Int. Cl.
*G06Q 30/0279* (2023.01)
*G06F 18/2113* (2023.01)
(Continued)

(52) U.S. Cl.
CPC ..... *G06F 18/2113* (2023.01); *G06Q 30/0279* (2013.01); *G06N 3/08* (2013.01); *G06N 20/00* (2019.01); *G06Q 30/0282* (2013.01)

(58) Field of Classification Search
CPC .................. G06Q 30/0279; G06Q 30/0282
See application file for complete search history.

(56) References Cited

U.S. PATENT DOCUMENTS 11,386,469 B1    7/2022  Gobel et al.
2005/0065809 A1*  3/2005  Henze ............... G06Q 30/0279
                                            705/329
(Continued)

OTHER PUBLICATIONS

Althoff, T and Leskovec, J, "Donor Retention in Online Crowdfunding Communities: A Case Study of DonorsChoose.org", [online] Mar. 2015 [retrieved on Apr. 28, 2022], Retrieved from the internet: <https://arxiv.org/abs/1503.02729> (Year: 2015).*

(Continued)

*Primary Examiner* — Lynda Jasmin
*Assistant Examiner* — Ehrin L Pratt
(74) *Attorney, Agent, or Firm* — Fish & Richardson P.C.

(57) ABSTRACT

Methods, systems, and apparatus, including computer programs encoded on a computer storage medium, for determining gratitude scores for a plurality of people who have interacted with an organization. In one aspect, a method comprises: obtaining, for each of a plurality of people who have interacted with an organization, history data characterizing previous interactions of the person with the organization and third party data characterizing aspects of the person outside of their previous interactions with the organization; and processing, for each of the plurality of people, the history data and the third party data for the person using a gratitude prediction machine learning model to generate a gratitude score for the person, wherein the gratitude score for the person characterizes a likelihood that the person will take a specified action on behalf of the organization in the future.

17 Claims, 7 Drawing Sheets

Related U.S. Application Data

(60) Provisional application No. 62/859,554, filed on Jun. 10, 2019, provisional application No. 62/854,127, filed on May 29, 2019.

(51) Int. Cl.
　　*G06N 20/00*　　　(2019.01)
　　*G06Q 30/0282*　　(2023.01)
　　*G06N 3/08*　　　(2023.01)

(56) References Cited

U.S. PATENT DOCUMENTS

| | | |
|---|---|---|
| 2009/0112699 A1 | 4/2009 | Rinker |
| 2015/0134556 A1 | 5/2015 | Spinner et al. |
| 2017/0169445 A1 | 6/2017 | Shuken et al. |
| 2018/0158114 A1 | 6/2018 | Twist et al. |
| 2019/0114569 A1* | 4/2019 | Palmer, II .......... G06Q 30/0279 |
| 2020/0043055 A1* | 2/2020 | Olds .................... G06F 16/951 |
| 2021/0374812 A1* | 12/2021 | Hoang ................. G06N 20/00 |

OTHER PUBLICATIONS

Althoff et al., "Donor Retention in Online Crowdfunding Communities: A Case Study of DonorsChoose.org," WWW '15: Proceedings of the 24th International Conference on World Wide Web, 2015, pp. 34-44.

Chad Gobel, U.S. Appl. No. 17/834,325, filed Jun. 7, 2022, Gratitute Prediction Machine Learning Models.

\* cited by examiner

600

| Prospects by Physician | Assets | Gratitude Score |
|---|---|---|
| Physician 001 | | |
| Patient 001 | 1,723,677 | 0.98 |
| Patient 002 | 3,508,276 | 0.83 |
| Physician 002 | | 0.09 |
| Patient 003 | 1,701,634 | 0.84 |
| Patient 004 | 5,779,919 | 0.77 |
| Patient 005 | 5,932,558 | 0.32 |
| Patient 006 | 6,586,019 | 0.14 |
| Physician 003 | | |
| Patient 007 | 1,479,805 | 0.88 |
| Patient 008 | 5,501,654 | 0.63 |
| Patient 009 | 6,791,124 | 0.27 |

FIG. 6

GRATITUDE PREDICTION MACHINE LEARNING MODELS

CROSS REFERENCE TO RELATED APPLICATION

This application is a continuation to U.S. patent application Ser. No. 16/823,535, filed on Mar. 19, 2020, which claims priority to U.S. Provisional Application No. 62/854,127, filed on May 29, 2019 and U.S. Provisional Application No. 62/859,554, filed on Jun. 10, 2019, the entire contents of which are hereby incorporated by reference in their entirety.

BACKGROUND

This specification relates to generating gratitude scores using a machine learning model.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a gratitude scoring system implemented as computer programs on one or more computers in one or more locations.

In one aspect, there is provided a method performed by one or more data processing apparatus, the method including obtaining, for each of multiple people who have interacted with an organization, history data characterizing previous interactions of the person with the organization and third party data characterizing aspects of the person outside of their previous interactions with the organization. For each of the multiple people, the history data and the third party data for the person is processed using a gratitude prediction machine learning model having a set of model parameters. The gratitude prediction machine learning model is configured to process the history data and the third party data for the person in accordance with trained values of the set of model parameters to generate a gratitude score for the person. The gratitude score for the person characterizes a likelihood that the person will take a specified action on behalf of the organization in the future. A ranking of the people is then determined based on their respective gratitude scores.

In some implementations, the gratitude prediction machine learning model includes one or more of: a decision tree model, a random forest model, a neural network model, a support vector machine model, or a linear model.

In some implementations, the gratitude score characterizes a likelihood that the patient will make a donation to the organization in the future.

In some implementations, the gratitude score characterizes a likelihood that the donation will be at least a positive threshold amount.

In some implementations, the organization is a healthcare organization and each of the people is a patient who has received healthcare services from the healthcare organization, and the history data for the person includes data characterizing one or more of: previous actions taken by the person on behalf of the healthcare organization, the healthcare services provided to the person by the healthcare organization, appointments where the person received healthcare services from the healthcare organization, a healthcare insurance policy of the person, responses provided by the person to surveys issued by the healthcare organization, and compensation received by the healthcare organization for providing healthcare services to the person.

In some implementations, the organization is a faith-based organization, and the history data for the person includes data characterizing one or more of: previous actions taken by the person on behalf of the faith-based organization, how frequently the person attends events hosted by the faith-based organization, and a length of time the person has been a member of the faith-based organization.

In some implementations, the faith-based organization is a religious organization.

In some implementations, the organization is an educational organization, each of the people have received educational services from the educational organization, and the history data for the person includes data characterizing one or more of: previous actions taken by the person on behalf of the educational organization, academic grades characterizing the academic performance of the person at the educational organization, educators at the educational organization who contributed to providing educational services to the person, a level of education completed by the person at the educational organization, attendance by the person at events hosted by or affiliated with the educational organization, and current or previous membership of the person in groups affiliated with the educational organization.

In some implementations, the method includes obtaining, for each of the people, demographic data for the person that specifies one or more of: an age of the person, a gender of the person, a marital status of the person, and languages spoken by the person. For each person, the demographic data for the person is processed in addition to the history data for the person and the third party data for the person using the gratitude prediction machine learning model to generate the gratitude score for the person.

In some implementations, the third party data for the person characterizes one or more of: a wealth of the person, actions taken by the person on behalf of other organizations, and actions related to the organization that are taken by the person on a social network.

In some implementations, the organization is a faith-based organization, and the third party data for the person characterizes one or more of: a number of family members of the person that are members of the faith-based organization, a number of family members of the person that receives educational services from an educational organization affiliated with the faith-based organization.

In some implementations, the organization is an educational organization, and the third party data for the person characterizes a number of family members of the person that have received educational services from the educational organization.

In some implementations, the method further includes obtaining, for each person, data characterizing a wealth of the person. The ranking of the people is determined based on, for each person: (i) the gratitude score for the person, and (ii) the wealth of the person.

In some implementations, determining a ranking of the people based on their respective gratitude scores includes identifying one or more people with the highest gratitude scores.

In some implementations, the method further includes providing data specifying the identified people with the highest gratitude scores for use in facilitating fundraising by the organization.

In some implementations, the gratitude prediction machine learning model is trained using supervised learning techniques based on a set of training examples. Each training example includes: (i) a training input including history data and third party data for a given person up to a given time point, and (ii) a target gratitude score characterizing whether the given person took the specified action on behalf of the organization after the given time point.

In some implementations, at each of multiple time points, the gratitude prediction machine learning model is re-trained using updated training examples.

In some implementations, for each person, a dimensionality of the history data and the third party data for the person exceeds 500 dimensions.

In some implementations, for each person, a dimensionality of the history data and the third party data for the person exceeds 1000 dimensions.

In some implementations, the method further includes, obtaining, for each person, updated history data and updated third party data. For each person, the updated history data and the updated third party data for the person is processed using the gratitude prediction machine learning model, in accordance with the trained values of the set of model parameters of the gratitude prediction machine learning model, to generate an updated gratitude score for the person. An updated ranking of the people is determined based on their respective updated gratitude scores.

According to a second aspect there are provided one or more non-transitory computer storage media storing instructions that when executed by one or more computers cause the one or more computers to perform operations including the operations of the method of the first aspect.

According to a third aspect there is provided a system including one or more computers and one or more storage devices communicatively coupled to the one or more computers. The one or more storage devices store instructions that, when executed by the one or more computers, cause the one or more computers to perform operations including the operations of the method of the first aspect.

Particular embodiments of the subject matter described in this specification can be implemented so as to realize one or more of the following advantages.

The gratitude scoring system described in this specification generates "gratitude scores" characterizing a likelihood that a person will take a specified action on behalf of an organization, e.g., make a financial donation to the organization or otherwise advance the cause of the organization, such as by volunteering time or other resources.

Gratitude towards a particular organization is a characteristic that is generally not directly measurable, thereby making it difficult to quantify, and even more difficult to predict for entities that have not previously taken the specified action on behalf of the organization. The gratitude scoring system discussed herein can generate the gratitude score for a person (or another entity, such as a corporate entity) by processing a set of features that characterize the person (or entity) using a gratitude prediction machine learning model. The gratitude prediction model is trained, using machine learning techniques, to learn to identify correlations between the features characterizing a person (or another entity) and the likelihood that the person (or other entity) will take a specified action on behalf of the organization.

In contrast, some conventional systems for predicting whether a person will take a specified action on behalf of an organization process a more limited set of features using a manually designed set of rules, which are basic in nature. By using machine learning techniques to train a gratitude prediction model that processes a more comprehensive set of features well beyond what could be analyzed by a human or solely in the human mind, the gratitude scoring system can determine mathematical relationships between the comprehensive set of features and corresponding gratitude scores. The gratitude prediction model can use those mathematical relationships to generate gratitude scores that are more accurate than those generated by conventional systems that process more limited sets of features using manually designed rules.

An organization can use the gratitude scores generated by the gratitude scoring system to optimize resource allocation and reduce the number of resources required to obtain a target objective. For example, a system can utilize the gratitude scores to prioritize allocation of resources to those entities that have a higher probability of taking the specified action (e.g., as indicated by their gratitude scores) over other entities that have a lower probability of taking the specified action (e.g., as indicated by their lower gratitude scores). In other words, the optimization of the resource allocation can be thought of as a resource allocation problem in which a limited set of resources are allocated based on the gratitude scores, so as to best utilize that limited set of resources to achieve the desired outcome. The resources at issue can include, for example, time, phone lines, computers, or other resources required to contact entities. In a specific example, an organization can fundraise or recruit volunteers more effectively by allocating more resources to soliciting donations from people (or other entities) with higher gratitude scores reflecting the higher probability that those people (or other entities) will perform the specified action (e.g., donate and/or volunteer). In particular, by using the gratitude scoring system, an organization can (in some cases) raise more funds while using fewer resources than it otherwise would.

The gratitude scoring system described in this specification can repeatedly re-train the gratitude prediction model over time based on updated training data, e.g., that updates existing training examples with more recent data. Re-training the gratitude prediction model can contribute to maintaining or increasing the accuracy of the gratitude prediction model, even as patterns of human behavior change over time (e.g., due to legal or regulatory changes, due to changes in societal norms or beliefs, or due to changes in underlying economic conditions). In contrast, some conventional systems rely on static, unchanging prediction models that may become less accurate over time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 illustrates an example of an output that can be generated by the gratitude scoring system.

Like reference numbers and designations in the various drawings indicate like elements.

DETAILED DESCRIPTION

Figure 1:
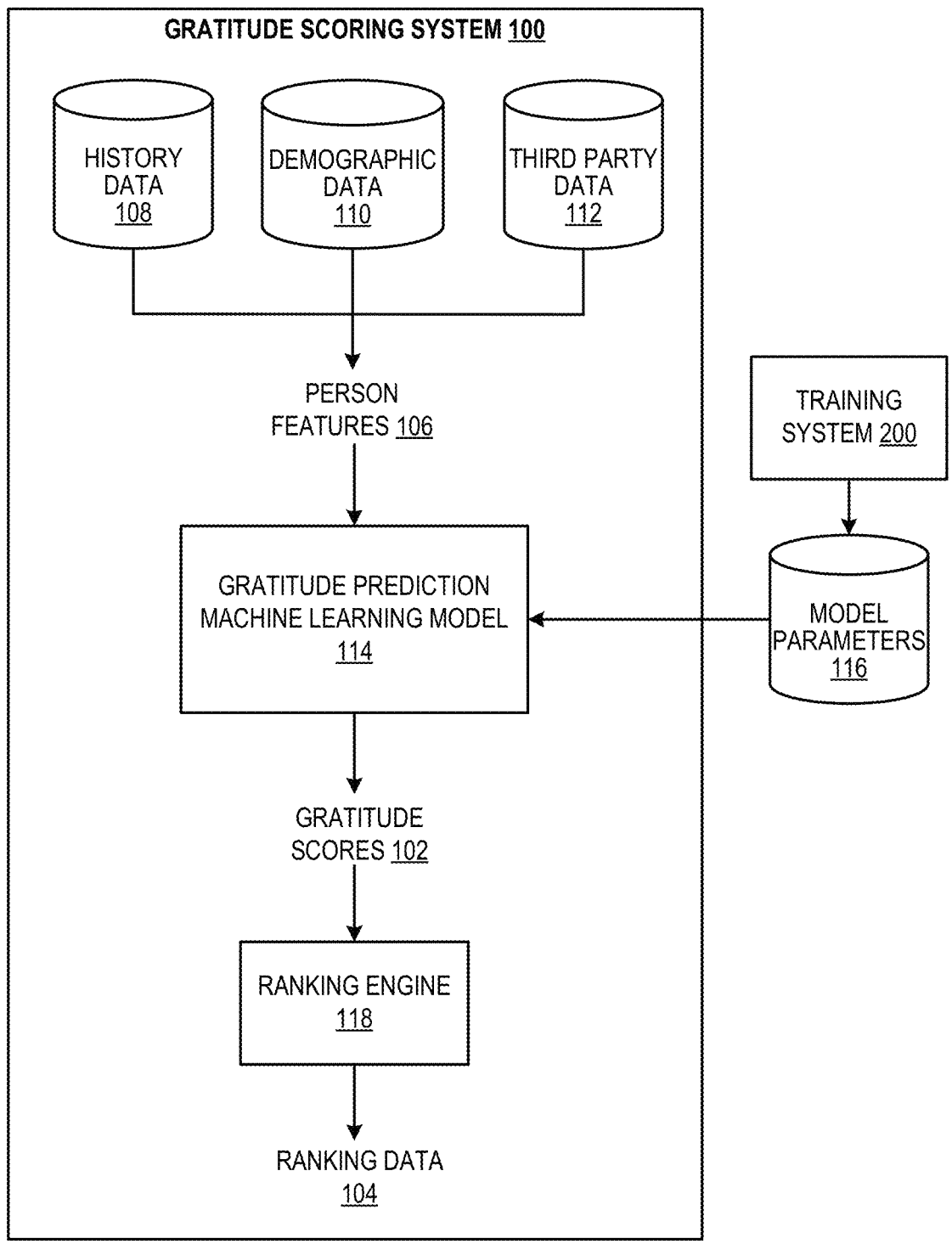
FIG. 1 shows an example gratitude scoring system.

This specification describes a gratitude scoring system for generating "gratitude scores" for people, such as patients who have received healthcare services from a healthcare organization or people who have interacted with another organization (e.g., an educational organization or a faith-based organization). The gratitude score generated by the system characterizes a likelihood that an entity (e.g., person or organization) will take a specified action. For example, in the context of a healthcare organization, the gratitude score for a patient (or another entity) characterizes a likelihood that the patient will take a specified action on behalf of the healthcare organization, e.g., make a donation to the healthcare organization.

To generate the gratitude score for a person, the gratitude scoring system aggregates data from a variety of sources to generate a set of person features characterizing the person. For example, the person features may characterize previous interactions of the person with the organization, e.g., previous donations made by the person to the organization, services provided to the person by the organization, or both. As another example, the person features may characterize aspects of the person outside of their previous interactions with the organization, e.g., the wealth of the person, or previous donations made by the person to other organizations.

The gratitude scoring system generates the gratitude score for the person by processing the set of person features characterizing the person using a gratitude prediction machine learning model. The gratitude prediction model has a set of model parameters that are trained using supervised machine learning techniques, and can be implemented in any of a variety of ways, e.g., as a random forest model or as a neural network model.

The organization can use the gratitude scores to optimize its allocation of resources, e.g., to fundraise more effectively by allocating more resources to soliciting donations from people with higher gratitude scores. For example, the organization can allocate resources to soliciting donations from people with the highest gratitude scores by engaging with them more directly (e.g., in person), while engaging less directly (e.g., by mail or over the phone) with people having lower gratitude scores.

While this specification primarily describes the gratitude scoring system as generating gratitude scores for people that have directly interacted with an organization, the gratitude scoring system can also be used to generate gratitude scores for people that have interacted only indirectly with the organization. For example, the gratitude scoring system can be used to generate gratitude scores for relatives of a person who received educational services from an educational organization, e.g., a parent of a person who attended a college.

For situations in which the system discussed herein collects and/or uses personal information about users, that information can be accessed and/or stored in compliance with appropriate data privacy laws and practices. For example, in the United States, medical data access, storage, and/or security can be performed in compliance with the Health Insurance Portability and Accountability Act of 1996 (HIPAA). Furthermore, data obtained from one organization can be maintained separately from data obtained from another organization.

These features and other features are described in more detail below.

FIG. 1 shows an example gratitude scoring system 100. The gratitude scoring system 100 is an example of a system implemented as computer programs on one or more computers in one or more locations in which the systems, components, and techniques described below are implemented.

The gratitude scoring system 100 is configured to generate respective gratitude scores 102 for multiple entities that have interacted (directly or indirectly) with a particular organization. After generating the respective gratitude scores 102 for the entities, the gratitude scoring system 100 can determine a ranking 104 of the entities based on their respective gratitude scores.

In some implementations, the gratitude scoring system 100 generates a gratitude score for each of multiple patients who have received healthcare services from a healthcare organization. In some implementations, the gratitude scoring system 100 generates a gratitude score for each of multiple people who have received educational services from an educational organization. In some implementations, the gratitude scoring system 100 generates a gratitude score for each of multiple people who have interacted with a faith-based organization.

A healthcare organization can refer to any public or private organization that provides healthcare services to patients, e.g., an academic medical center, a community hospital, a network of hospitals, or a rehabilitation center. Healthcare services can refer to any services provided to a patient that are directed to the physical or mental health of the patient, e.g., dermatological services, radiological services, emergency medicine services, family medicine services, internal medicine services, psychiatric services, preventative medicine services, physical rehabilitation services, alcohol and drug rehabilitation services, and the like.

A patient refers to a person who is currently receiving healthcare services from the healthcare organization or who has received healthcare services from the healthcare organization in the past.

An educational organization can refer to any public or private organization that provides educational services to people, e.g., a college or university, a network of colleges or universities, a trade school, or a professional school (e.g., law school or medical school). Educational services can refer to any services provided to a person that are directed to educating the person, e.g., by training the person to perform certain tasks, e.g., engineering tasks, legal tasks, or medical tasks.

A faith-based organization can refer to any organization that is based on religious or spiritual beliefs, e.g., that promotes religious or spiritual beliefs, e.g., a religious organization.

In some implementations, the gratitude score 102 for an entity (e.g., person) characterizes a likelihood that the entity will take a specified action on behalf of the organization. For example, the gratitude score for an entity may be a numerical value in the range [0,1] representing a probability that the entity will take a specified action. The specified action may be, e.g., making a (financial) donation to the organization, making a financial donation of at least a positive threshold amount to the organization, volunteering at the organization, or taking any other appropriate action that advances the interests of the organization.

For convenience, this document primarily describes generating gratitude scores 102 for people that have interacted with an organization.

To generate the gratitude score 102 for a person, the gratitude scoring system 100 determines a set of person features 106 characterizing the person. The person features 106 can be represented as an ordered collection of numerical values, e.g., a vector or matrix of numerical values. Generally, the person features 106 can characterize any aspect of the person, and are obtained from one or more of a variety of sources. In one implementation, the person features 106 are obtained from sources including one or more of: history data 108, demographic data 110, or third party data 112, which will each be described in more detail next.

The history data 108 characterizes previous interactions of the person with the organization.

In one example, the history data 108 may specify previous actions taken by the person on behalf of the organization, e.g., the amount of any previous donations made by the person to the organization or other affirmative acts the person has taken to advance the cause of the organization.

In another example, the history data 108 may characterize instances where the organization has encouraged the person to take a specified action on behalf of the organization. For example, the history data 108 may characterize the number of occasions where the organization has communicated with the person to encourage the person to make a donation to the organization.

A few examples of history data 108 characterizing previous interactions of a patient with a healthcare organization follow.

In another example, the history data 108 may characterize healthcare services provided to the patient by the healthcare organization, e.g., hospitals affiliated with the healthcare organization where the patient has received healthcare services, hospital departments where the patient has received healthcare services (e.g., dermatology, urology, etc.), the number of hospital departments where the patient has received healthcare services, and healthcare providers (e.g., physicians) who have contributed to providing healthcare services to the patient.

In another example, the history data 108 may characterize appointments made by the patient to receive healthcare services from the healthcare organization, e.g., the number of appointments made by the patient, whether the appointments were inpatient or outpatient appointments, and the duration of the appointments.

In another example, the history data 108 may characterize the health insurance policy of the patient, e.g., whether the patient has a health insurance policy, and if they do, which organization provides the health insurance policy, and which healthcare services are covered by the health insurance policy.

In another example, the history data 108 may characterize responses provided by the patient to one or more surveys issued by the healthcare organization. The surveys may be issued to the patient, e.g., by telephone, letter mail, or email, or may be provided to the patient in person (e.g., when the patient is on the premises of the healthcare organization). The surveys may prompt the patient to provide responses to questions relating to, e.g., the quality of care provided by the healthcare organization, the likelihood that the patient would recommend the healthcare organization to others, and an overall rating by the patient of the healthcare organization.

In another example, the history data 108 may characterize the compensation received by the healthcare organization for providing healthcare services to the patient, e.g., the amount of compensation, and whether the compensation was received from an insurance provider or directly from the patient.

A few examples of history data 108 characterizing previous interactions of a person with a faith-based organization follow.

In one example, the history data 108 may characterize how frequently the person attends events hosted by or affiliated with the faith-based organization, e.g., how frequently the person attends prayer or worship meetings, sermons, religious study group meetings, or social gatherings hosted by or affiliated with the faith-based organization.

In another example, the history data 108 may characterize the length of time the person has been a "member" of the faith-based organization, e.g., the duration of time since the person first attended an event hosted by the faith-based organization.

A few examples of history data 108 characterizing previous interactions of a person with an educational organization follow.

In one example, the history data 108 may characterize academic grades achieved by the person at the educational organization, e.g., a measure of central tendency of the grades achieved by the person (e.g., a grade point average), or a measure of dispersion of the grades achieved by the person (e.g., the variance or standard deviation of the grades achieved by the person).

In another example, the history data 108 may characterize educators at the educational organization who contributed to providing educational services to the person, e.g., teachers or professors who taught classes attended by the person.

In another example, the history data 108 may characterize whether the person was subjected to disciplinary action by the educational organization, e.g., for violation of academic or campus rules or policies. In a particular example, the history data 108 may characterize a number of parking tickets issued to the person for parking violations on the property of the educational organization.

In another example, the history data 108 may characterize a level of education completed by the person at the educational organization, e.g., whether the person completed a bachelor's degree, a master's degree, or a doctorate at the educational organization.

In another example, the history data 108 may characterize attendance by the person at events hosted by or affiliated with the educational organization, e.g., sporting events, alumni panels, or reunions.

In another example, the history data 108 may characterize current or previous membership of the person in groups affiliated with the educational organization, e.g., alumni association groups, fraternities, sororities, academic groups, or competitive groups (e.g., debating teams or sports teams).

In another example, the history data 108 may characterize how many relatives of the person (e.g., within the immediate family of the person) also received educational services from the educational organization.

In another example, the history data 108 may characterize a field of study undertaken by the person at the educational organization, e.g., the major of the person at a college or university.

The demographic data 110 characterizes demographic features of the person, e.g., the age, gender, marital status, profession, and languages spoken by the person.

The third party data 112 characterizes aspects of the person outside of their previous interactions with the organization. For example, the third party data 112 may characterize a predicted (or known) wealth of the patient (e.g., measured in dollars). As another example, the third party data 112 may characterize any actions taken by the patient on behalf of other organizations (e.g., donations made by the patient to other organizations). As another example, the third party data 112 may characterize actions related to the organization that are taken by the person on a social network, e.g., liking or following a social network presence of the organization, liking or sharing posts made by the organization on the social network, or posting content that references the organization on the social network.

A few examples of third party data 112 characterizing aspects of the person outside of their previous interactions with a faith-based organization follow.

In one example, the third party data 112 may characterize the number of family members of the person (e.g., in the immediate or extended family of the person) that are members of the faith-based organization.

In another example, the third party data 112 may characterize whether the person, or any family members of the person, receive educational services from educational organized affiliated with the faith-based organization. In a particular example, the third party data 112 may characterize whether any children of the person attend a Sunday school affiliated with the faith-based organization. In another particular example, the third party data 112 may characterize whether the person or any family members of the person have attended a religious college or university associated with the faith of the faith-based organization.

As an example of third party data 112 characterizing aspects of the person outside of their previous interactions with an educational organization, the third party data 112 may characterize the number of family members of the person that have also received educational services from the educational organization. In a particular example, the educational organization may be a college or a university, and the third party data 112 may characterize the number of family members of the person that have also attended the college or university.

The history data 108, demographic data 110, and third party data 112 may be stored in any of a variety of locations. For example, the history data 108 and demographic data 110 may be stored in databases controlled by the organization, while the third party data 112 may be data that is accessible to the gratitude scoring system 100 but that is controlled by a third party. In one example, the organization may compensate a third party for providing the gratitude scoring system 100 with access to third party data controlled by the third party.

The history data 108, the demographic data 110, and the third party data 112 can be indexed in any of a variety of ways, e.g., based on a unique identifier corresponding to the person or based on the name of the person. To obtain the person features 106 for a person, the gratitude scoring system 100 can match, e.g., the unique identifier and/or the name, to corresponding records in the various databases. After matching the person to corresponding records in one or more databases, the gratitude scoring system 100 can retrieve the corresponding records (e.g., by transmitting requests for the records over a data communication network), and then use the retrieved records to determine the person features 106.

The gratitude scoring system 100 is configured to determine the person features 106 in a manner that complies with all laws and regulations relevant to collecting, storing, and processing patient data, e.g., the Health Insurance Portability and Accountability Act (HIPAA). In some cases, prior to determining person features 106 for a patient, the gratitude scoring system 100 may determine whether the patient has taken actions to "opt-out" of making their personal data available for processing by the gratitude scoring system 100. In response to determining that the patient has opted-out, the gratitude scoring system 100 may refrain from collecting, storing, or processing the personal data of the patient.

After determining the person features 106 characterizing the person, the gratitude scoring system 100 provides the person features 106 to a gratitude prediction machine learning model 114 having a set of model parameters 116. The gratitude prediction model 114 is configured to process the person features 106 in accordance with trained values of the model parameters 116 to generate the gratitude score 102 for the person.

The gratitude prediction model 114 can be implemented in any of a variety of ways. For example, the gratitude prediction model 114 can be implemented as a decision tree model, a random forest model, a neural network model, a support vector machine model, or a linear model. Rather than being implemented by a single model, the gratitude prediction model 114 may be an ensemble (i.e., combination) of multiple models. For example, the gratitude prediction model 114 may be a combination of multiple neural network models, where each of the neural network models has a different neural network architecture.

The trained values of the model parameters 116 of the gratitude prediction model 114 are determined, and in some cases, repeatedly updated, by a training system 200 using supervised machine learning training techniques. An example of a training system 200 that can be used to determined trained values of the model parameters 116 is described in more detail with reference to FIG. 2.

After the gratitude scoring system 100 generates a respective gratitude score 102 for each of multiple people, a ranking engine 118 is configured to process the gratitude scores 102 to generate corresponding ranking data 104. In one example, the ranking data 104 identifies one or more people with the highest gratitude scores, e.g., a predetermined number of people with the highest gratitude scores, or each person having a gratitude score that satisfies a predetermined threshold. In another example, the ranking data 104 specifies an ordering of the people based on their respective gratitude scores, e.g., from highest gratitude score to lowest gratitude score, or from lowest gratitude score to highest gratitude score.

In some implementations, the ranking engine 118 determines the ranking data 104 based on the predicted (or known) wealth of the people in addition to their gratitude scores. A few examples of using wealth data in conjunction with gratitude scores to generate the ranking data 104 are described next.

In one example, the ranking engine 118 can use the wealth data and the gratitude scores to determine an assignment of each person into one of four categories: a high wealth—high gratitude category, a low wealth—low gratitude category, a high wealth—low gratitude category, and a low wealth— high gratitude category. The ranking engine 118 may assign a person to the high wealth—high gratitude category if the wealth of the person exceeds a first predetermined threshold and the gratitude score of the person exceeds a second predetermined threshold. The ranking engine 118 may assign a person to the low wealth—low gratitude category if the wealth of the person does not exceed the first predetermined threshold and the gratitude score of the person does not exceed the second predetermined threshold. The ranking engine 118 may assign a person to the high wealth—low gratitude category if the wealth of the person exceeds the first predetermined threshold and the gratitude score of the person does not exceed the second predetermined threshold. The ranking engine 118 may assign a person to the low wealth—high gratitude category if the wealth of the person does not exceed the first predetermined threshold and the gratitude score of the person exceeds the second predetermined threshold. In this example, the ranking data 104 may identify the respective wealth—gratitude category that is assigned to each person.

In another example, the ranking engine 118 can determine a composite score for each person as a function (e.g., a product) of the wealth of the person and the gratitude score for the person. After identifying the composite score for each person, the ranking engine 118 can generate the ranking data 104 based on the composite scores, e.g., by identifying one or more people with the highest composite scores, or by specifying a ranking of people from highest composite score to lowest composite score or vice versa.

The ranking data 104 may be provided to a user of the gratitude scoring system 100, e.g., through a graphical user interface (GUI) made available by the gratitude scoring system 100, e.g., in a mobile or desktop application. The ranking data 104 may also be provided to a customer relationship management (CRM) system, e.g., through an application programming interface (API) made available by the gratitude scoring system 100.

The ranking data 104 can be processed to facilitate further interactions where the organization encourages certain people to take specified actions on behalf of the organization. For example, the ranking data 104 can be processed to generate a "call list" that specifies that specifies the names and telephone numbers of a set of people having gratitude scores within a predetermined range of values (e.g., greater than a threshold value). As another example, the ranking data 104 can be processed to generate a "mailing list" that specifies the names and mailing addresses of a set of people having gratitude scores within another predetermined range of values (e.g., greater than another threshold value). Call lists or mailing lists generated using the ranking data 104 may be automatically provided to appropriate individuals or systems to facilitate communication between the organization and the people specified by the lists, e.g., to solicit donations for the organization.

The ranking data 104 can also be processed to facilitate the solicitation of feedback regarding experiences that people had with the organization. For example, the ranking data can be processed to generate a "survey list" that specifies the names and contact information (e.g., telephone number or address) of a set of people having gratitude scores within a predetermined range of values (e.g., less than a threshold value). Survey lists generated using the ranking data 104 may be automatically provided to appropriate individuals or systems, e.g., that can issue survey questions to the people specified by the survey list by letter mail, email, or telephone.

Generally, certain aspects of the history data 108, the demographic data 110, and the third party data 112 may change over time, e.g., due to people receiving additional healthcare services or making charitable donations to other organizations. To account for changes in the data characterizing the people that have interacted with the organization, the gratitude scoring system 100 may be configured to repeatedly determine updated ranking data. More specifically, at each of multiple time points, the gratitude scoring system 100 may determine updated person features by aggregating the most recent data characterizing the people that have interacted with the organization, and process the updated person features to generate updated gratitude scores and updated ranking data. The gratitude scoring system 100 may be configured to determined updated gratitude scores and updated ranking data at regular intervals, e.g., once per day.

Figure 2:
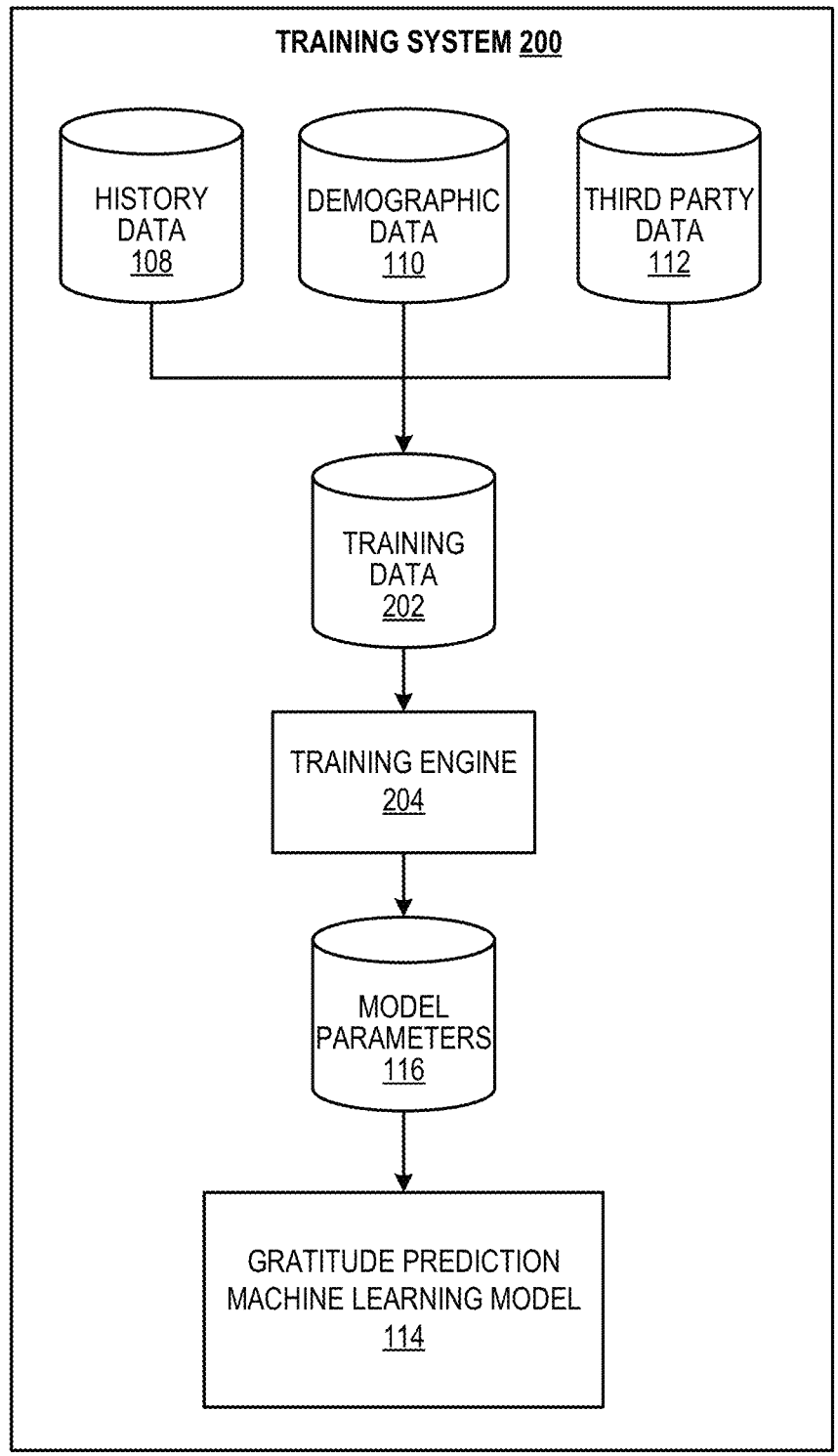
FIG. 2 shows an example training system.

FIG. 2 shows an example training system 200. The training system 200 is an example of a system implemented as computer programs on one or more computers in one or more locations in which the systems, components, and techniques described below are implemented.

The training system 200 is configured to train the gratitude prediction model 114 by determining trained values of the model parameters 116 of the gratitude prediction model 114 using a set of training data 202.

The training data 202 includes multiple training examples. Each training example corresponds to a respective person, and is composed of: (i) a set of person features for the person, and (ii) a corresponding target gratitude score representing the output that should be generated by the gratitude prediction model by processing the person features for the person.

To generate the training data 202, the training system 200 identifies a prior "cut-off" date, and generates a respective training example for each person using data up to the cut-off date. In one example, the training system 200 generates training examples for patients that have interacted with a healthcare organization from one or more of: the history data 108, the demographic data 110, and the third party data 112. In this example, the training system 200 can determine the person features for a patient using history data 108 characterizing interactions of the patient with the healthcare organization that occurred on or before the cut-off date. The training system 200 can determine the target gratitude score for a person based on actions taken by the person on behalf of the organization between the cut-off date and the current date. For example, the training system 200 can determine the target gratitude score to be "1" if the person made a donation to the organization between the cut-off date and the current date, and "0" otherwise.

Prior to generating a training example corresponding to a patient that has interacted with a healthcare organization, the training system 200 may determine whether, as of the current date, the patient has opted-out of making their personal data available for use by the gratitude scoring system 100. In response to determining that a patient has opted-out, the training system 200 may refrain from generating a training example corresponding to the patient.

The training system 200 uses a training engine 204 to train the gratitude prediction model 114 on the training data 202. Generally, the training engine 204 trains the gratitude prediction model 114 using supervised learning techniques, that is, by determining trained values of the model parameters 116 that cause the gratitude prediction model 114 to generate gratitude scores that match the target gratitude scores specified by the training examples. The specific operations performed by the training engine 204 to train the gratitude prediction model 114 depend on the architecture of the gratitude prediction model 114, e.g., whether the gratitude prediction model 114 is a neural network model or a random forest model.

In one example, the gratitude prediction model 114 is a neural network model, and the training engine 204 trains the neural network model over multiple training iterations.

At each training iteration, the training engine 204 selects a "batch" (i.e., set) of one or more training examples from the training data 202. The training engine 204 uses the neural network model to process the person features included in the batch of training examples, in accordance with the current values of the model parameters 116, to generate corresponding gratitude scores. The training engine 204 then determines gradients of an objective function that measures a similarity between: (i) the gratitude scores generated by the neural network model, and (ii) the corresponding target gratitude scores specified by the training examples, and uses the gradients to adjust the current values of the model parameters 116.

The training engine 204 can determine gradients of the objective function with respect to the model parameters using, e.g., backpropagation techniques, and can use any appropriate gradient descent optimization procedure (e.g., Adam or RMSprop) to adjust the current values of the model parameters 116 using the gradients. The objective function may be, e.g., a cross-entropy loss objective function or a hinge loss objective function.

The training engine 204 may determine that the training of the neural network model is complete when a training termination criterion is satisfied. For example, the training engine 204 may determine the training is complete when a predetermined number of training iterations have been performed. As another example, the training engine 204 may determine the training is complete when the performance (e.g., prediction accuracy) of the neural network model, evaluated on a set of "validation data", achieves a maximum value. The validation data refers to a set of training examples that are not used to determine adjustments to the values of model parameters 116 during training.

In some cases, the training system 200 repeatedly re-trains the gratitude prediction model 114 over time. For example, the training system 200 may re-train the gratitude prediction model 114 at fixed intervals, e.g., once per month. Each time the training system 200 re-trains the gratitude prediction model, it updates the training data 202 based on potential changes in the data characterizing the people that have interacted with the organization. For example, for patients that have interacted with a healthcare organization, the training system 200 updates the training data 202 based on potential changes in one or more of: the history data 108, the demographic data 110, and the third party data 112. Moreover, the number of people who have interacted with the organization generally increases over time, and the training system 200 can generate new training examples corresponding to new people interacting with the organization.

Re-training the gratitude prediction model 114 can contribute to maintaining or increasing the accuracy of the gratitude prediction model 114, even as patterns of human behavior change over time. Patterns of behavior may change over time for any of a variety of reasons. For example, legal or regulatory changes (e.g., in the tax code), or changes in underlying economic conditions (e.g., economic growth or overall employment), may cause certain people to become more likely or less likely to make donations to an organization.

Figure 3:
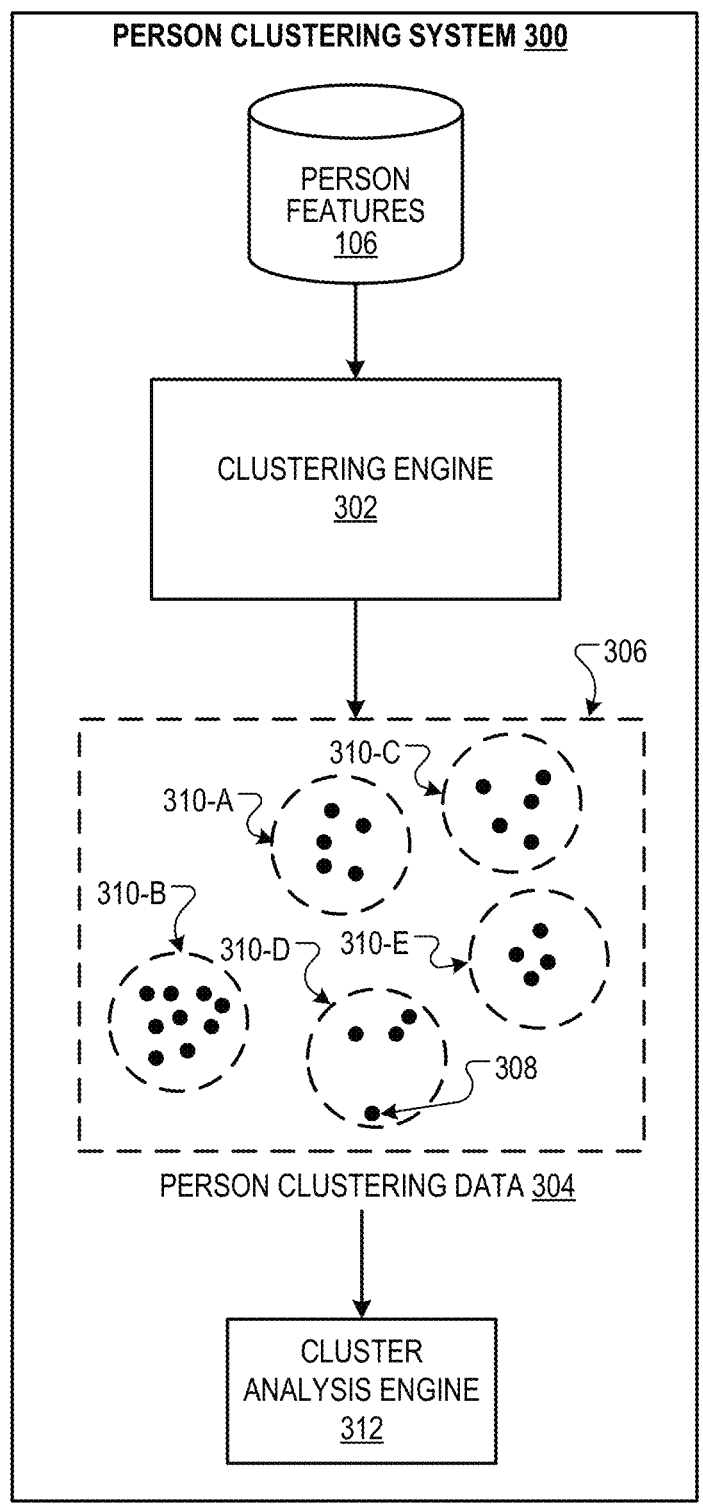
FIG. 3 shows an example patient clustering system.

FIG. 3 shows an example person clustering system 300. The person clustering system 300 is an example of a system implemented as computer programs on one or more computers in one or more locations in which the systems, components, and techniques described below are implemented.

The person clustering system 300 is configured to "segment" a set of people (or other entities) who have interacted with the organization into different groups by clustering their respective person features 106. As will be described in more detail below, the person clustering system 300 can analyze the resulting clusters in various ways to generate data that can be used for a variety of purposes.

The person clustering system 300 uses a clustering engine 302 to process the set of person features 106 to generate corresponding person clustering data 304.

The person features 106 characterizing a person can be represented as an ordered collection of numerical values, e.g., a vector of numerical values, and can be obtained from any of a variety of sources. In one example, the person features may characterize a patient that has interacted with a healthcare organization, and are obtained from sources including one or more of: patient history data, demographic data, or third party data. Examples of generating person features 106 for a person are described in more detail with reference to FIG. 1.

The person clustering data 304 generated by the clustering engine 302 defines an assignment of each person to a corresponding group of one or more people, referred to as a "cluster". Generally, different clusters may include different numbers of people. The person clustering data 304 can be represented, e.g., by a mapping table that associates each person with a corresponding numerical index (e.g., a positive integer value) that identifies a respective cluster.

The illustration 306 depicts a simplified example of person clustering data 304. In the illustration 306, each solid black circle (e.g., the solid black circle 308) represents a set of person features corresponding to a person. For illustrative purposes only, the person features 106 are represented as being two-dimensional (2D). More generally, the person features corresponding to each person could be represented as a higher-dimensional ordered collection of numerical values, e.g., with 100 dimensions, 500 dimension, or 1000 dimensions. The illustration 306 depicts people that have interacted with the organization as being grouped into five clusters: 310-A, 310-B, 310-C, 310-D, and 310-E.

The clustering engine 302 can use any appropriate clustering technique to generate the person clustering data 304, e.g., a k-means clustering technique or an expectation-maximization (EM) clustering technique. Generally, the clustering engine 302 generates person clustering data 304 in a manner that causes the features of people assigned to the same cluster to be more "similar" than the features of people assigned to different clusters. The similarity between features corresponding to different people can be measured using any appropriate numerical similar measure, e.g., a cosine similarity measure or a Euclidean similarity measure.

In some implementations, the person features used for purposes of clustering people (or other entities) excludes data indicating whether the people have previously taken the specified action (e.g., whether they have donated in the past or volunteered time in the past). By excluding this data indicating whether people have previously taken the specified action during the clustering phase, the system can generate clusters of people independent of whether they have taken the specified action, and then after clusters are generated, use information about whether people have taken the specified action to identify those clusters that contain higher percentages of people who have taken the specified action, as discussed further below.

The person clustering system 300 uses a cluster analysis engine 312 to process the person clustering data 304. The cluster analysis engine 312 can analyze the person clustering data 304 in any of a variety of ways.

For example, the cluster analysis engine 312 can determine, for each cluster, a fraction of people included in the cluster that have taken a specified action on behalf of the organization, e.g., made a donation to the organization. In this example, the person features 106 processed by the clustering engine 302 may exclude data characterizing whether the people have taken the specified action on behalf of the organization. The cluster analysis engine 312 can identify one or more clusters having the highest fraction of people that have taken the specified action, and then generate data specifying people who: (i) are included in one of the identified clusters, and (ii) have not taken the specified action. That is, the cluster analysis engine 312 can generate data specifying people that are similar to other people that have taken the specified action, but that have not taken the specified action themselves.

In this example, the cluster analysis engine 312 can be understood as "discovering" people who have not taken the specified action themselves, but may be likely to do so in the future based on their similarity to people who have taken the specified action. If the specified action refers to making a donation, the organization may prioritize the solicitation of donations from the people identified by the output of the clustering analysis engine 302 in fundraising campaigns (as described earlier). Furthermore, this information can be further used to predict whether newly identified people are likely to perform the specified action based on their level of similarity to those people in the clusters having the highest fraction of people that performed the specified action.

Generally, the person features 106 may change over time (e.g., as patients receive additional healthcare services from a healthcare organization) and person features 106 characterizing additional people may be added. To account for these changes, the clustering engine 302 can repeatedly re-cluster the person features 106 over time to update the person clustering data 304. The cluster analysis engine 312 can perform a new analysis of the person clustering data 304 after each time the person clustering data 304 is updated by the clustering engine 302.

Figure 4:
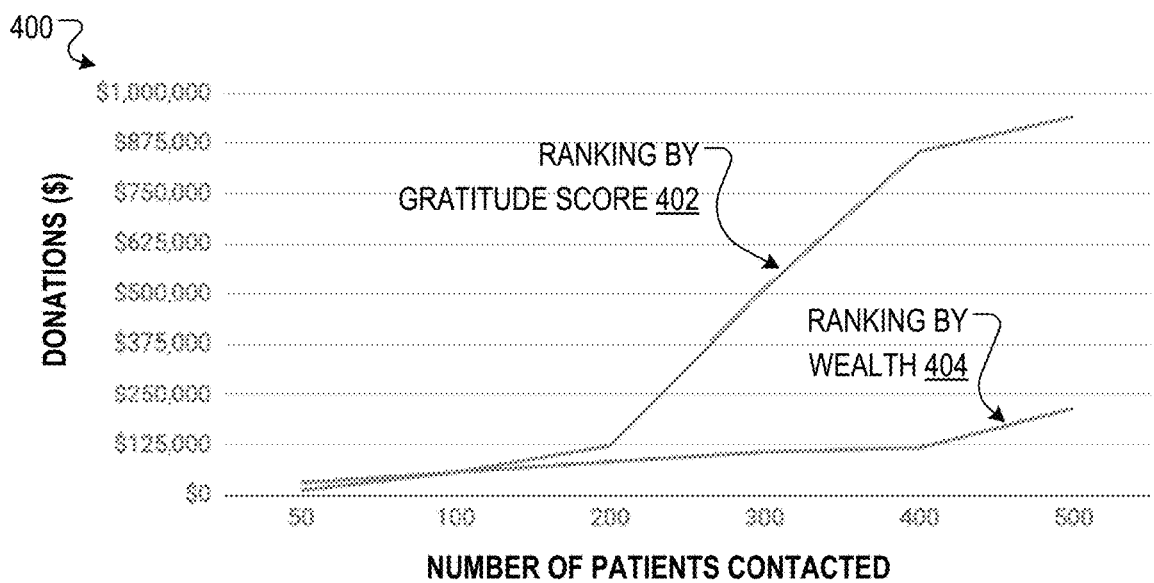
FIG. 4 illustrates an example of the performance gains that can be achieved in healthcare fundraising using the gratitude scoring system.

FIG. 4 illustrates an example of the performance gains that can be achieved in healthcare fundraising using the gratitude scoring system 100 described with reference to FIG. 1. The horizontal axis of the graph 400 indicates the number of patients contacted by a healthcare organization for healthcare fundraising, i.e., to solicit donations to the healthcare organization. The vertical axis of the graph 400 indicates the cumulative total of donations received from the contacted patients (measured in dollars). These graphs indicate that resources can be more efficiently and effectively allocated relative to the way in which they were allocated using conventional systems by utilizing the gratitude scores generated by the gratitude scoring system 100 to prioritize the allocation of resources.

The line 402 indicates the donations received from 500 patients of the healthcare organization with the highest gratitude scores, i.e., as generated by the gratitude scoring system 100. The line 404 indicates the donations received from 500 patients of the healthcare organization with the highest wealth. It can be appreciated that, in this example, the healthcare organization achieves a substantially higher cumulative total of donations by prioritizing fundraising efforts based on patient gratitude scores rather than on patient wealth.

Figure 5:
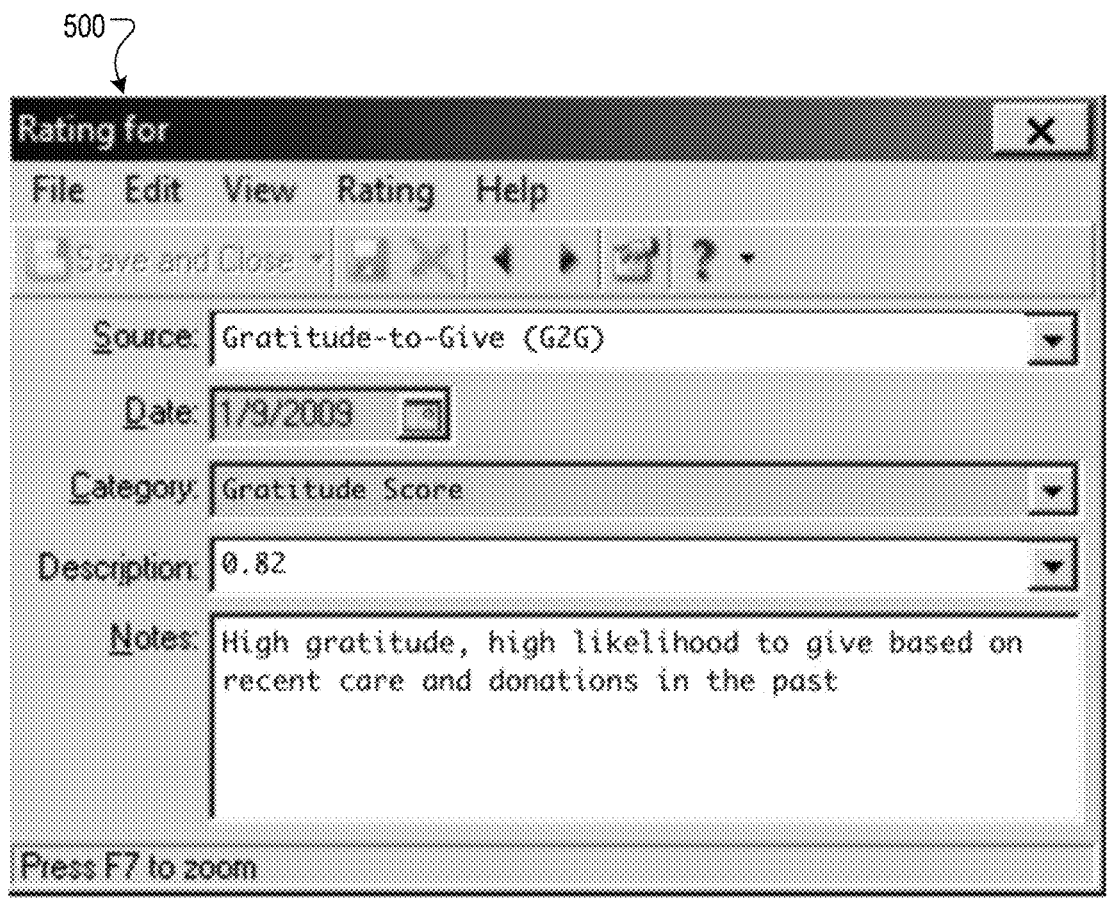
FIG. 5 illustrates an example of a graphical user interface (GUI) that can be made available to users of the gratitude scoring system.

FIG. 5 illustrates an example of a graphical user interface (GUI) 500 that can be made available to users of the gratitude scoring system 100 described with reference to FIG. 1. The GUI 500 indicates that the gratitude score for a particular patient of a healthcare organization is 0.82, suggesting that the patient is likely to make a donation to the healthcare organization. Users of the gratitude scoring system 100 may include, e.g., hospital administrators tasked with managing fundraising campaigns for a healthcare organization. The GUI 500 can provide any of a variety of functionalities and visualization capabilities to users of the gratitude scoring system 100. For example, the GUI can enable visualization of the relative gratitude scores of different people that have interacted with the healthcare organization, or changes over time in the gratitude scores corresponding to particular people that have interacted with the healthcare organization.

FIG. 6 illustrates an example of an output 600 that can be generated by the gratitude scoring system 100. The output 600 indicates, for each of multiple physicians employed by a healthcare organization: (i) one or more patients receiving healthcare services from the physician, and (ii) the respective assets (i.e., wealth, measured in dollars) and gratitude score of each of the patients.

Figure 7:
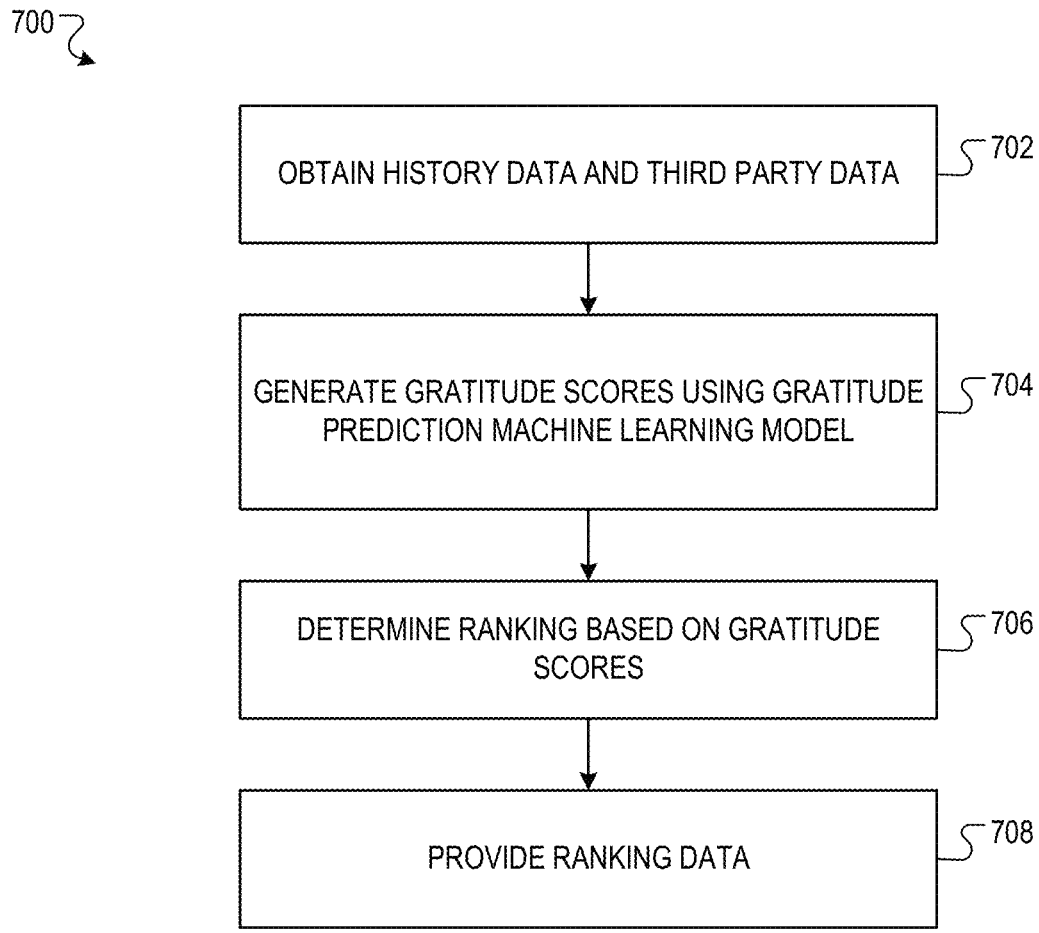
FIG. 7 is a flow diagram of an example process for generating gratitude scores for people who have interacted with an organization, and ranking the people who have interacted with the organization based on their respective gratitude scores.

FIG. 7 is a flow diagram of an example process 700 for generating gratitude scores for people who have interacted with an organization, and ranking the people who have interacted with the organization based on their respective gratitude scores. For convenience, the process 700 will be described as being performed by a system of one or more computers located in one or more locations. For example, a gratitude scoring system, e.g., the gratitude scoring system 100 of FIG. 1, appropriately programmed in accordance with this specification, can perform the process 700.

The system obtains history data and third party data characterizing each of multiple people who have interacted with an organization (702).

The history data for a person characterizes previous interactions of the person with the organization. For example, the history data for a person may include data characterizing previous actions taken by the person on behalf of the organization.

In some implementations, the organization is a healthcare organization and the history data characterizes healthcare services provided to the patient by the healthcare organization, appointments where the patient received healthcare services from the healthcare organization, a healthcare insurance policy of the patient, responses provided by the patient to surveys issued by the healthcare organization, and compensation received by the healthcare organization for providing healthcare services to the patient.

In some implementations, the organization is a faith-based organization (e.g., a religious organization) and the history data characterizes how frequently the person attends events hosted by the faith-based organization and a length of time the person has been a member of the faith-based organization.

In some implementations, the organization is an educational organization and the history data characterizes one or more of: academic grades characterizing the academic performance of the person at the educational organization, educators at the educational organization who contributed to providing educational services to the person, a level of education completed by the person at the educational organization, attendance by the person at events hosted by or affiliated with the educational organization, and current or previous membership of the person in groups affiliated with the educational organization.

The third party data for a person characterizes aspects of the person outside of their previous interactions with the organization. For example, the third party data for a person may include data characterizing one or more of: the wealth of the person, actions taken by the person on behalf of other organizations, and actions related to the organization that are taken by the person on a social network.

In some implementations, the organization is a faith-based organization, and the third party data for the person characterizes one or more of: a number of family members of the person that are members of the faith-based organization, a number of family members of the person that receives educational services from an educational organization affiliated with the faith-based organization.

In some implementations, the organization is an educational organization, and the third party data for the person characterizes a number of family members of the person that have received educational services from the educational organization.

The system can also obtain demographic data characterizing each of the multiple people who have interacted with the organization. The demographic data for a person characterizes demographic features of the person, e.g., including one or more of: the age of the person, the gender of the person, the marital status of the person, and the languages spoken by the person.

For each person, the dimensionality of the history data, third party data, and demographic data for the person can, in some cases, exceed 500 dimensions or 1000 dimensions.

For each person, the system processes the history data and the third party data for the person using a gratitude prediction machine learning model, in accordance with trained values of the model parameters of the gratitude prediction model, to generate a gratitude score for the person (704). Optionally, the system may also process the demographic data for the person using the gratitude prediction machine learning model to generate the gratitude score for the person. The gratitude score for a person characterizes a likelihood that the person will take a specified action on behalf of the organization in the future. For example, the gratitude score may characterize a likelihood that the person will make a donation to the organization in the future, or a likelihood that the person will make a donation of at least a positive threshold amount to the organization in the future.

The gratitude prediction model may include one or more of: a decision tree model, a random forest model, a neural network model, a support vector machine model, or a linear model. The gratitude prediction model is trained using supervised learning techniques based on a set of training examples. Each training example can include: (i) a training input specifying history data and third party data for a given person up to a given time point, and (ii) a target gratitude score characterizing whether the given person took the specified action on behalf of the organization after the given time point. In some implementations, the gratitude prediction machine learning model is re-trained at each of multiple time points using updated training examples.

The system determines a ranking of the people who have interacted with the organization based on their respective gratitude scores (706). For example, the system may identify one or more people with the highest gratitude scores. In some implementations, the system can use data characterizing the wealth of the people in combination with their respective gratitude scores in determining the ranking of the people.

The system provides the ranking data to a user of the system (708). For example, the system may provide the ranking data to the user of the system through an API or GUI made available by the system.

In some implementations, the system repeatedly updates the ranking of the people using updated gratitude scores. More specifically, at one or more subsequent time points, the system can obtain updated history data and updated third party data for each person. The system can process the updated history data and the updated third party data using the gratitude prediction model to generate updated gratitude scores for each person. The system can then determine the updated ranking of the people based on their respective updated gratitude scores.

Figure 8:
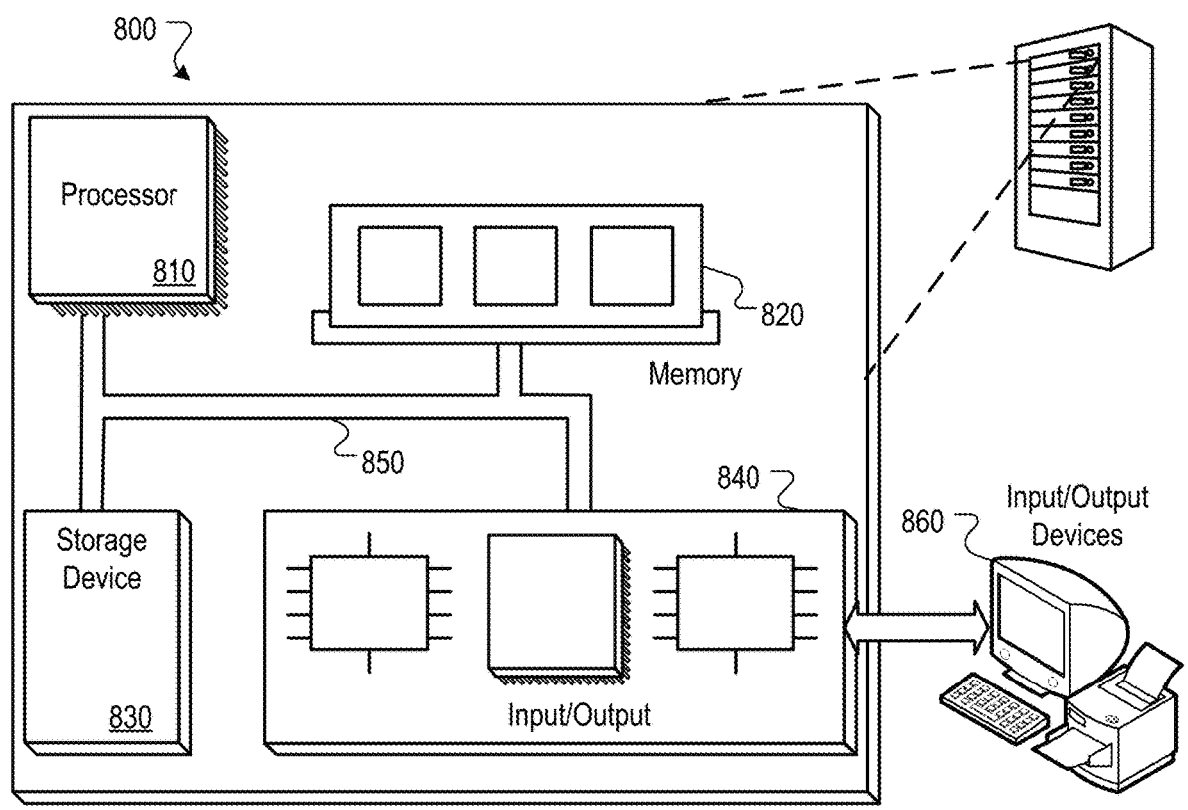
FIG. 8 is block diagram of an example computer system that can be used to perform the operations of the gratitude scoring system.

FIG. 8 is block diagram of an example computer system 800 that can be used to perform operations described above. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, a storage device that is shared over a network by multiple computing devices (e.g., a cloud storage device), or some other large capacity storage device.

The input/output device 840 provides input/output operations for the system 800. In one implementation, the input/output device 840 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   obtaining a plurality of training examples, wherein each training example corresponds to a respective person that has interacted with an organization, and each training example comprises: (i) a training input comprising history data characterizing previous interactions of the corresponding person with the organization, and (ii) a target gratitude score that characterizes whether the corresponding person has taken a specified action on behalf of the organization;
   training a gratitude prediction machine learning model having a plurality of model parameters on the plurality of training examples, wherein:
      the gratitude prediction machine learning model is configured to process history data for an input person in accordance with values of the plurality of model parameters of the gratitude prediction machine learning model to generate a gratitude score for the input person;
      the gratitude score for the input person characterizes a likelihood that the input person will take the specified action on behalf of the organization in the future;
      training the gratitude prediction machine learning model comprises determining trained values of the model parameters of the gratitude prediction machine learning model from initial values of the model parameters of the gratitude prediction machine learning model by a machine learning training technique; and
      training the gratitude prediction machine learning model on the plurality of training examples comprises, for each training example, training the gratitude prediction machine learning model to process the training input of the training example to generate an output gratitude score that matches the target gratitude score for the training example;
   after training the gratitude prediction machine learning model:
      generating a respective gratitude score for each of a plurality of people using the trained machine learning model;
      determining a ranking of the plurality of people based at least in part on their respective gratitude scores; and
      taking an action based on the ranking of the plurality of people, comprising:
         processing the ranking of the plurality of people based on their respective gratitude scores to automatically generate a communication list that designates a subset of the plurality of people; and
         automatically transmitting communications using the subset of the plurality of people that are designated by the communication list;
   determining that a criterion for re-training the gratitude prediction machine learning model has been satisfied, comprising determining that the gratitude prediction machine learning model has not been re-trained for at least a threshold duration of time; and
   in response:

determining an updated set of training examples for training the gratitude prediction machine learning model wherein the updated set of training examples include at least one new training example that was not previously used for training the gratitude prediction machine learning model;
re-training the gratitude prediction machine learning model on the updated set of training examples; and
determining an updated ranking of the plurality of people using the re-trained gratitude prediction machine learning model.

2. The method of claim 1, wherein the gratitude prediction machine learning model is configured to process both history data and third party data for the input person, wherein the third party data characterizes aspects of the input person outside of their previous interactions with the organization.

3. The method of claim 1, wherein the third party data characterizes actions taken by the input person on behalf of other organizations, actions related to the organization that are taken by the input person on a social network, or both.

4. The method of claim 1, wherein the ranking of the plurality of people identifies one or more people with the highest gratitude scores from among the plurality of people.

5. The method of claim 1, wherein the ranking of the plurality of people identifies each person having a gratitude score that exceeds a predefined threshold.

6. The method of claim 1, wherein the ranking of the plurality of people defines an ordering of the plurality of people based on their respective gratitude scores.

7. The method of claim 6, wherein the ordering is a highest-to-lowest ordering.

8. The method of claim 1, wherein the ranking of the plurality of people classifies each person into a set of categories including a high gratitude category and a low gratitude category.

9. The method of claim 1, further comprising
determining, for each of the plurality of people, a respective measure of resources associated with the person;
wherein the ranking of the plurality of people is further based at least in part on the respective measure of resources associated with each person.

10. The method of claim 9, further comprising:
determining, for each of the plurality of people, a respective composite score for the person based on: (i) the gratitude score for the person, and (ii) the measure of resources associated with the person;
wherein the ranking of the plurality of people is based on the respective composite score for each person.

11. The method of claim 9, wherein the ranking of the plurality of people classifies each person into a set of categories including a high resource—high gratitude category, a low resource—low gratitude category, a low resource—high gratitude category, and a high resource—low gratitude category.

12. The method of claim 1, wherein the organization is a healthcare organization, and the gratitude prediction machine learning model is configured to process history data for the input person that characterizes previous interactions of the input person with the organization in relation to healthcare services provided to the input person by the organization.

13. The method of claim 1, wherein the history data for the input person characterizes one or more of: appointments where the input person received healthcare services from the organization, compensation received by the organization for providing healthcare services to the input person, hospitals affiliated with the organization where the input person has received healthcare services, hospital departments where the input person has received healthcare services, or healthcare providers who have contributed to providing healthcare services to the input person.

14. The method of claim 1, wherein the organization is a healthcare organization, and the gratitude prediction machine learning model is configured to process history data for the input person that characterizes previous interactions of the input person with the organization outside of the provision of healthcare services to the input person by the organization.

15. The method of claim 14, wherein the history data for the input person characterizes one or more of: responses provided by the input person to surveys issued by the organization, or
previous actions taken by the input person on behalf of the organization.

16. A system comprising:
one or more computers; and
one or more storage devices communicatively coupled to the one or more computers, wherein the one or more storage devices store instructions that, when executed by the one or more computers, cause the one or more computers to perform operations comprising:
obtaining a plurality of training examples, wherein each training example corresponds to a respective person that has interacted with an organization, and each training example comprises: (i) a training input comprising history data characterizing previous interactions of the corresponding person with the organization, and (ii) a target gratitude score that characterizes whether the corresponding person has taken a specified action on behalf of the organization;
training a gratitude prediction machine learning model having a plurality of model parameters on the plurality of training examples, wherein:
the gratitude prediction machine learning model is configured to process history data for an input person in accordance with values of the plurality of model parameters of the gratitude prediction machine learning model to generate a gratitude score for the input person;
the gratitude score for the input person characterizes a likelihood that the input person will take the specified action on behalf of the organization in the future;
training the gratitude prediction machine learning model comprises determining trained values of the model parameters of the gratitude prediction machine learning model from initial values of the model parameters of the gratitude prediction machine learning model by a machine learning training technique; and
training the gratitude prediction machine learning model on the plurality of training examples comprises, for each training example, training the gratitude prediction machine learning model to process the training input of the training example to generate an output gratitude score that matches the target gratitude score for the training example;
after training the gratitude prediction machine learning model:
generating a respective gratitude score for each of a plurality of people using the trained machine learning model;
determining a ranking of the plurality of people based at least in part on their respective gratitude scores; and taking an action based on the ranking of the plurality of people, comprising:
  processing the ranking of the plurality of people based on their respective gratitude scores to automatically generate a communication list that designates a subset of the plurality of people; and
  automatically transmitting communications using the subset of the plurality of people that are designated by the communication list;
determining that a criterion for re-training the gratitude prediction machine learning model has been satisfied, comprising determining that the gratitude prediction machine learning model has not been re-trained for at least a threshold duration of time; and
in response:
  determining an updated set of training examples for training the gratitude prediction machine learning model, wherein the updated set of training examples include at least one new training example that was not previously used for training the gratitude prediction machine learning model;
  re-training the gratitude prediction machine learning model on the updated set of training examples; and
  determining an updated ranking of the plurality of people using the re-trained gratitude prediction machine learning model.

17. One or more non-transitory computer storage media storing instructions that when executed by one or more computers cause the one or more computers to perform operations comprising:
  obtaining a plurality of training examples, wherein each training example corresponds to a respective person that has interacted with an organization, and each training example comprises: (i) a training input comprising history data characterizing previous interactions of the corresponding person with the organization, and (ii) a target gratitude score that characterizes whether the corresponding person has taken a specified action on behalf of the organization;
  training a gratitude prediction machine learning model having a plurality of model parameters on the plurality of training examples, wherein:
    the gratitude prediction machine learning model is configured to process history data for an input person in accordance with values of the plurality of model parameters of the gratitude prediction machine learning model to generate a gratitude score for the input person;
    the gratitude score for the input person characterizes a likelihood that the input person will take the specified action on behalf of the organization in the future;
    training the gratitude prediction machine learning model comprises determining trained values of the model parameters of the gratitude prediction machine learning model from initial values of the model parameters of the gratitude prediction machine learning model by a machine learning training technique; and
    training the gratitude prediction machine learning model on the plurality of training examples comprises, for each training example, training the gratitude prediction machine learning model to process the training input of the training example to generate an output gratitude score that matches the target gratitude score for the training example;
  after training the gratitude prediction machine learning model:
    generating a respective gratitude score for each of a plurality of people using the trained machine learning model;
    determining a ranking of the plurality of people based at least in part on their respective gratitude scores; and
    taking an action based on the ranking of the plurality of people, comprising:
      processing the ranking of the plurality of people based on their respective gratitude scores to automatically generate a communication list that designates a subset of the plurality of people; and
      automatically transmitting communications using the subset of the plurality of people that are designated by the communication list;
    determining that a criterion for re-training the gratitude prediction machine learning model has been satisfied, comprising determining that the gratitude prediction machine learning model has not been re-trained for at least a threshold duration of time; and
    in response:
      determining an updated set of training examples for training the gratitude prediction machine learning model, wherein the updated set of training examples include at least one new training example that was not previously used for training the gratitude prediction machine learning model;
      re-training the gratitude prediction machine learning model on the updated set of training examples; and
      determining an updated ranking of the plurality of people using the re-trained gratitude prediction machine learning model.

* * * * *